US009215597B2

(12) United States Patent
Eckhardt

(10) Patent No.: US 9,215,597 B2
(45) Date of Patent: Dec. 15, 2015

(54) METHOD OF COORDINATING CONCURRENT SECTOR OPTIMIZATIONS IN A WIRELESS COMMUNICATION SYSTEM

(75) Inventor: Harald Eckhardt, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 19 days.

(21) Appl. No.: 13/422,261

(22) Filed: Mar. 16, 2012

(65) Prior Publication Data

US 2013/0244668 A1    Sep. 19, 2013

(51) Int. Cl.
| | | |
|---|---|---|
| H04W 40/00 | (2009.01) | |
| H04W 16/02 | (2009.01) | |
| H04W 36/00 | (2009.01) | |
| H04W 16/18 | (2009.01) | |

(52) U.S. Cl.
CPC .............. *H04W 16/02* (2013.01); *H04W 16/18* (2013.01)

(58) Field of Classification Search
USPC ........................................................ 455/466
See application file for complete search history.

(56) References Cited

U.S. PATENT DOCUMENTS

| | | | | |
|---|---|---|---|---|
| 2003/0060205 | A1* | 3/2003 | Shapira .......................... | 455/446 |
| 2004/0083468 | A1* | 4/2004 | Ogawa et al. .................. | 717/151 |
| 2008/0096569 | A1* | 4/2008 | Khandekar et al. ............ | 455/442 |
| 2009/0186623 | A1* | 7/2009 | Matsuzawa .................... | 455/447 |
| 2011/0044193 | A1* | 2/2011 | Forenza et al. ................ | 370/252 |
| 2012/0003984 | A1* | 1/2012 | Cesar et al. .................... | 455/450 |
| 2012/0162009 | A1* | 6/2012 | Kim et al. ....................... | 342/372 |
| 2012/0178462 | A1* | 7/2012 | Kim ............................... | 455/450 |

OTHER PUBLICATIONS

Eckhardt et al., Vertical Antenna Tilt Optimization for LTE Base Stations *VTC Spring*, pp. 1-5. *IEEE*, (2011).
Goldman et al., A Modification to the Chandy-Misra Dining Philosophers Algorithm to Support Dynamic Resource Conflict Graphs, pp. 1-6, Jul. 23, 1998.
Welch et al., *A Modular Drinking Philosophers Algorithm* Jun. 1, 2001 pp. 0-28.
Chandry et al., *The Drinking Philosophers Problem* University of Texas at Austin pp. 632-646, vol. 6, No. 4, Oct. 1984.
Dijkstra, Edgser W., *Cooperating Sequential Processes* http://www.cs.utexas.edu/~EWD/transcriptions/EWDo1xx/EWD123.html, retrieved Mar. 15, 2010 pp. 1-87.

* cited by examiner

*Primary Examiner* — Timothy Pham
(74) *Attorney, Agent, or Firm* — Davidson Sheehan LLP

(57) ABSTRACT

Embodiments of the claimed subject matter provide a method and apparatus for coordinating concurrent sector optimizations in a wireless communication system. One exemplary embodiment of the method includes determining neighbor relationships between sectors and constructing a precedence graph using the neighbor relationships to link neighboring sectors by a plurality of directed arcs to indicate relative precedence of the neighboring sectors. The exemplary embodiment the method also includes iteratively allocating one or more antenna resources of each of the sectors by selecting a subset of the sectors as master sectors, concurrently optimizing allocation of the antenna resource for each master sector and its associated slave sectors, and reversing precedence indicated by the directed arcs linked to each master sector following optimization of the allocation of the antenna resource(s).

15 Claims, 9 Drawing Sheets

METHOD OF COORDINATING CONCURRENT SECTOR OPTIMIZATIONS IN A WIRELESS COMMUNICATION SYSTEM

BACKGROUND

This application relates generally to communication systems, and, more particularly, to wireless communication systems.

Wireless communication systems typically deploy numerous base stations (or other types of wireless access points such as eNodeBs) for providing wireless connectivity to user equipment such as mobile units or other wireless-enabled devices. Each base station is responsible for providing wireless connectivity to the user equipment located in a particular cell or sector served by the base station. The air interface between the base station and the user equipment supports downlink (or forward link) channels for carrying information from the base station to the user equipment and uplink (or reverse link) channels for carrying information from the user equipment to the base station. The uplink and/or downlink channels typically include data channels for carrying data traffic such as voice information and control channels for carrying control signal such as pilot signals, synchronization signals, acknowledgment signals, and the like.

Conventional base stations may use antennas or arrays of antennas that can be reconfigured after deployment. For example, parameters such as the antenna tilt, azimuth, transmission power, or beamwidth can be varied to modify the coverage area of the antenna or antenna array. The typical approach for reconfiguring base station antennas uses drive-by testing to evaluate the coverage provided by a network of base stations and then manually reconfiguring the base station antennas to modify the coverage area based upon the results of the drive-by testing. However, manual intervention is typically very costly, which limits its applicability.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for coordinating concurrent sector optimization in a wireless communication system. One exemplary embodiment of the method includes determining neighbor relationships between sectors and constructing a precedence graph using the neighbor relationships to link neighboring sectors by a plurality of directed arcs to indicate relative precedence of the neighboring sectors. The exemplary embodiment the method also includes iteratively allocating one or more antenna resources of each of the sectors by selecting a subset of the sectors as master sectors, concurrently optimizing allocation of the antenna resource for each master sector and its associated slave sectors, and reversing precedence indicated by the directed arcs linked to each master sector following optimization of the allocation of the antenna resource(s).

In another embodiment, a base station is provided for coordinating concurrent sector optimization at the wireless communication system. One exemplary embodiment of the base station includes one or more antennas, a transceiver for transmitting and receiving signals via the antennas, and an antenna controller configurable to allocate antenna resources. The antenna controller allocates the antenna resources by determining whether a sector served by the base station is a master sector or a slave sector based on a precedence graph that links the sector to neighboring sectors by a plurality of directed arcs to indicate relative precedence of the sector and the neighboring sectors. The antenna controller optimizes allocation of antenna resources of the sector and the neighboring sectors in response to determining that the sector is the master sector and receives information indicating allocation of antenna resources for the sector in response to determining that the sector is the slave sector for one of the neighboring sectors. The precedence indicated by the directed arcs is reversed following optimization of the allocation of the antenna resources or reception of the information indicating allocation of the antenna resources of the sector.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
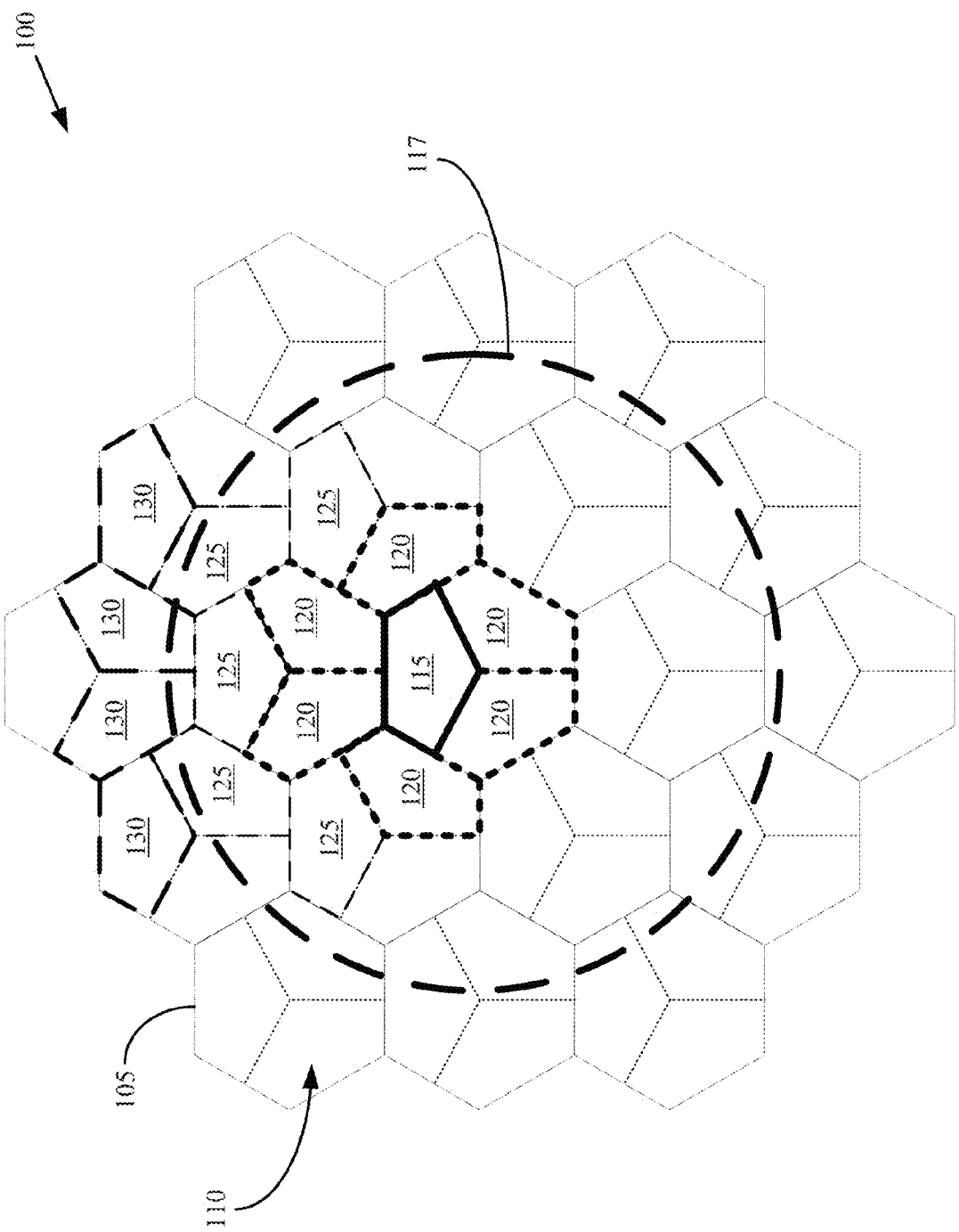
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It will thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

A wireless communication system includes numerous base stations that provide wireless connectivity (which may also be referred to as coverage) to a correspondingly large number of sectors. Radio transmissions from one sector typically interact with or disturb radio transmissions from neighboring sectors. The interaction of radio transmissions and the disturbances caused by these interactions may be collectively referred to as interference. The sector coverage or the interference between neighboring sectors can be optimized by allocating sector resources such as antenna tilt, azimuth, power, beamwidth, and the like. For example, the antenna resources of one sector (e.g., the master sector) can be optimized in conjunction with the antenna resources of neighboring sectors (e.g., one or more slave sectors) that may be influenced by changes in the allocation of the antenna resources of the master sector. A simple pattern or sequence can be defined so that each sector has the opportunity to be a master sector during at least one optimization interval while also acting as a slave sector for other neighboring sectors during other optimization intervals.

Optimizations for groups of master sectors can be performed concurrently as long as only one sector at a time is the master sector for a particular slave sector. Furthermore, the separation between the master sectors in the predetermined pattern should be selected carefully to manage the mutual interference between sectors while also making the number of master sectors involved in the concurrent optimization as large as possible. Interference between the master sectors decreases as the distance between the master sectors increases. However, if the distance between the master sectors specified by the predetermined pattern is too large, then the amount of concurrency is reduced. If the distance is too small, interference between the master sectors is too large and the optimization may be difficult or impossible to perform. The predetermined pattern may balance these competing demands in favor of interference reduction by selecting a relatively large distance between the master sectors. However, adopting a relatively large separation also reduces the number of optimizations that can be performed concurrently. Moreover, the separation typically cannot be modified in response to changes in the performance of the different sectors, e.g. in response to changes in environmental conditions, interfering obstacles, and the like when the separation is determined based on a predetermined range of mutual interference. In some embodiments, extra negotiation and signaling between sectors may be used to modify the separation(s) on the fly.

At least in part to address these drawbacks in the conventional practice, the present application describes embodiments of techniques for coordinating concurrent sector optimization of the wireless communication system. In one embodiment, potential master sectors can identify the neighboring sectors that would act as the slave sectors during an optimization performed by each potential master sector. For example, a group of sectors can be identified as the slave sectors for a particular master sector based on the uplink or downlink radiation pattern of the master sector, environmental conditions, interfering obstacles, and the like. Alternatively, neighboring sectors can be identified using signaling from user equipment that tells the potential master sector which sectors have been detected by user equipment. In one embodiment, signaling between sectors can also be used to populate the neighbor list with neighbor-of-neighbor information. A directed graph can then be defined to indicate precedence for each sector to become a master sector.

Initially, the precedence graph may be defined by assigning different identifiers to each sector and then determining the precedence based upon a comparator such as "greater than." However, alternative techniques for breaking the initial symmetry between the sectors may also be used. The relative precedence between each pair of sectors can be indicated by a directed arc that points from the sector with lower precedence to the sector with higher precedence. Subsequent precedence(s) can be determined by reversing the direction of precedence indicated by the directed arc between a master sector and each related slave sector in response to the master sector completing an iteration of the optimization process. Sectors may be chosen to be master sectors when they have precedence over all the neighbor sectors needed for the optimization and the antenna resources of the selected master sectors and slave sectors may be concurrently optimized. The packing density of the master sectors can be increased by identifying neighboring sectors using performance measurements or inter-sector signaling and then allocating the master/slave sectors for iterations of the optimization process using the precedence graph. Embodiments of the techniques described herein may therefore significantly increase the concurrency of the optimization process and reduce the time required to perform iterations. The process can be iterated until each sector has had an opportunity to become the master sector for a selected number of optimization intervals.

FIG. 1 conceptually illustrates a first exemplary embodiment of a wireless communication system 100. In the illustrated embodiment, the wireless communication system 100 operates according to the standards or protocols of the Long Term Evolution (LTE) of the standards agreed upon by the Third Generation Partnership Project (3GPP). However, persons of ordinary skill in the art having benefit of the present disclosure should appreciate that this embodiment is intended to be illustrative. Alternative embodiments of the wireless communication system 100 may operate according to other standards, protocols, or combinations thereof. The wireless communication system 100 includes numerous base stations (not shown in FIG. 1) that are configured to provide wireless connectivity to user equipment (not shown in FIG. 1) within corresponding cells 105. Wireless connectivity is provided using antennas or antenna arrays associated with the base station. As discussed herein, the antennas or antenna arrays can be configured to operate using parameters such as an antenna tilt, an azimuth, a transmission power, a beamforming parameter, or a beamwidth. These parameters can be modified during operation of the antennas and may therefore be referred to as dynamic antenna parameters.

In the illustrated embodiment, each cell 105 includes three sectors 110 that are served by corresponding antennas or antenna arrays associated with the base stations. For example, a base station may include three antenna arrays and each of the antenna arrays may be used to provide coverage to one of the sectors 110 in the corresponding cell 105. As used herein, the term "sector" refers to a geographical area served by one or more antennas in the base station. The boundaries of sectors may be defined by transmission powers of the base station, a beamwidth or angular extent of a radiation pattern defined by the antenna configuration, and other factors such as geography, topology, physical obstructions, and other environmental factors. In some embodiments, the term "sector" may be synonymous with the term "cell" or (as in the illustrated embodiment) it may refer to a subset of a particular cell 105 associated with a base station. In the illustrated embodiment, each sector 110 is assigned to a sector identifier that identifies the sector within the communication system 100. The cells 105 are depicted in FIG. 1 as perfect hexagons and the sectors 110 are depicted as pentagonal portions of the hexagons. However, persons of ordinary skill in the art should appreciate that the coverage areas of actual cells 105 or sectors 110 may be irregular and may change over time, e.g., due to frequency, temporal, or spatial fading caused by geography, topology, physical obstructions, and other environmental factors.

The neighbor relationships between the sectors 110 may be determined using cell planning information, measurements performed by the base stations, measurements performed by user equipment operating in the sectors 110, or other information. In one embodiment, each sector 110 has access to existing neighborhood lists provided by the wireless communication system 100, such as a neighbor-of-neighbor-of-neighbor- . . . list that can be built to any depth of neighbor relations. The depth of the neighbor relations list may be chosen based on the mutual interference levels between one sector and neighbors at the lowest level of the neighbor relations list. For example, the depth of the neighbor relations list may be limited to neighbors that interfere with a sector at a level that is above a predetermined threshold.

The levels of mutual interference can be determined using performance measurements made by the base stations or user equipment that indicate the radiation patterns associated with the sectors 110. For example, the radiation pattern for the downlink caused by each base station's emissions may be measured by the user equipment and reported to their serving base station. The radiation pattern for the uplink caused by user equipment transmissions may be measured by their serving base station or neighboring base stations. The mutual interference levels may therefore be determined without deploying additional equipment or requiring additional manual testing such as drive tests that measure radiation patterns using detectors in cars that drive through the coverage area of the wireless communication system 100. Consequently, the radiation patterns, interference levels, or neighbor lists can be determined dynamically in response to particular events, at predetermined time intervals, or substantially continuously to reflect changing conditions within the wireless communication system 100.

In the illustrated embodiment, the sector 115 (indicated by a bold line) is selected as a master sector and FIG. 1 depicts exemplary neighbors of the sector 115. The dashed circle 117 indicates the cells that neighbor the cell including the master sector 115. In one embodiment, performance measurements may be used to identify the sectors 120 as immediate neighbor sectors to the sector 115. e.g., because the mutual interference between the sectors is above a first threshold. Sectors 125 may be identified as relevant neighbors-of-neighbors to the sector 115 based on mutual interference between the sector 115 and the sectors 125, mutual interference between the sectors 120 and the sectors 125, or other criteria. In the illustrated embodiment, the depth of the neighbor list is three and sectors 130 may be identified as relevant neighbors-of-neighbors-of-neighbor-of-neighbors to the sector 115 based on mutual interference between combinations of the sectors 115, 120, 125, 130. However, persons of ordinary skill in the art having benefit of the present disclosure should appreciate that the depth of the neighbor list may differ from the illustrated embodiment so that the depth may be larger or smaller than shown in FIG. 1.

The neighbor list may be constructed iteratively in some embodiments. In one embodiment, the sector 115 may know its direct neighbor sectors 120 from measurements performed by user equipment served by the sector 115 or the sectors 120. The sectors 115, 120 may therefore be added to the neighbor list. For example, neighbor sectors 120 may be detected by user equipment when the user equipment can receive signaling from sectors other than the sector that is their current serving sector. Signals from neighboring sectors can be received by user equipment when the received signal has a minimum signal strength and signal to interference plus noise ratio (SINR). If the signal strength and interference requirements are fulfilled, the user equipment can decode the received signals and retrieve information identifying the neighbor sectors. The identifying information or the signal strength may then be reported to the base station that controls the sector 115 that is serving the user equipment. The sector 115 may then request information from the sectors 120 that indicates the sectors that are direct neighbors of each sector 120. In one embodiment, the neighbors-of-neighbors information is retrieved by neighborhood-request signaling between base stations or sectors and the network addresses can be derived from the sector identification information that is reported by the user equipment. Addresses of the more distant neighbors may be contained in the reply that is received by the sector 120 and this address information can be conveyed to the sector 115. In various embodiments, the communication between the sectors of base stations can be by direct links or via intermediate nodes (acting as routers) if no direct link is established.

The sectors identified by each sector 120 may then be added to the neighbor list. Duplicate sectors that are identified by more than one sector 120 may be removed. The procedure may continue iteratively with each set of newly added neighbors providing information indicating their direct neighbors to the sector 115 so that the newly identified neighbors may be added to the neighbor list for the sector 115. The procedure may continue until a stop criteria is reached, e.g., after the procedure has performed a predetermined number of cycles or satisfied some other radio dependent criteria such as the mutual interference between the sector 115 and the newly added sectors falling below a threshold.

The neighbor lists for each of the sectors 110 may be used to select master sectors and slave sectors that correspond to the sectors indicated in the neighbor list for the master sector. The master sectors operate as optimization centers for controlling optimization of antenna parameters in the master sector and its associated slave sectors. For example, if the sector 115 is selected as a master sector, the sector 115 controls optimization of the antenna parameters for the sectors 115, 120, 125, 130. Multiple master sectors can perform the optimization procedure concurrently as long as the slave sectors for each master sector are under the control of a single master sector during the concurrent optimization process. The present application describes techniques for selecting the master sectors in the wireless communication system 100 to attempt to create as much parallelism as possible by attempting to optimize or maximize the number of master sectors that can perform the optimization procedure concurrently. Embodiments of the techniques described herein may be able to manage the selection of master sectors in an efficient, distributed, concurrent, and deadlock-free manner including the dynamics of added/removed/failed entities and a dynamically adjustable mutual interference range.

In one embodiment, sectors 110 may be selected as master sectors by constructing a precedence graph using the neighbor relationships to link neighboring sectors by directed arcs that indicate relative precedence of the neighboring sectors. The precedence graph may be initialized by assigning unique or random numbers to each sector 110 and then establishing the relative precedence between the sectors 110 using operations such as "greater than." Sectors 110 may be selected as master sectors when the sector 110 has precedence over its associated slave sectors, which may be identified using the neighbor relationships. The master and slave sectors are also determined subject to the constraint that each slave sector is only associated with one master sector. Once the master and slave sectors have been selected, allocation of antenna resources for each master sector and its associated slave sectors may be concurrently optimized, as discussed herein. The precedence indicated by the directed arcs linked to each master sector may then be reversed when the optimization process for the master sector is complete. The process can be iterated until a stopping criterion is reached, e.g., until each of the sectors 110 is selected as a master sector for a predetermined number of iterations.

Figure 2A:
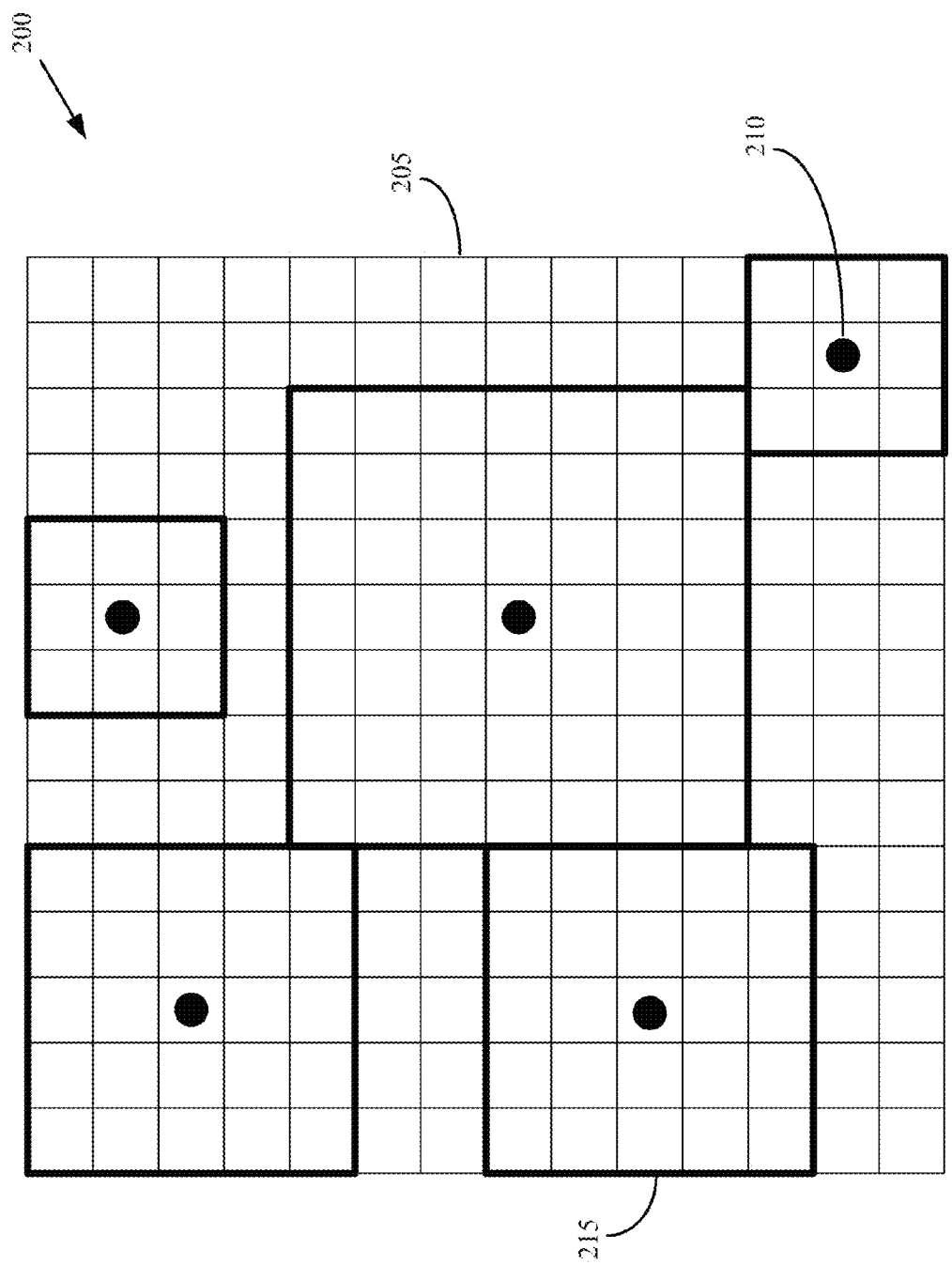
FIG. 2A conceptually illustrates a first exemplary embodiment of a distribution of master sectors and associated slave sectors in a wireless communication system.

FIG. 2A conceptually illustrates a first exemplary embodiment of a distribution of master sectors and associated slave sectors in a wireless communication system 200. In the illustrated embodiment, the sectors 205 are depicted as squares in the interest of clarity. However, persons of ordinary skill in the art having benefit of the present disclosure should appreciate that in practice the sectors 205 may have irregular and possibly time varying shapes. The master sectors are indicated by the circles 210 and have been selected according to embodiments of the techniques described herein. The bold squares 215 indicate the neighboring sectors that are under exclusive control of the corresponding master sector 210 during an iteration of embodiments of the optimization procedure described herein. The number of neighboring sectors associated with each master sector 210 can vary, but each slave sector is only associated with one master sector.

Figure 2B:
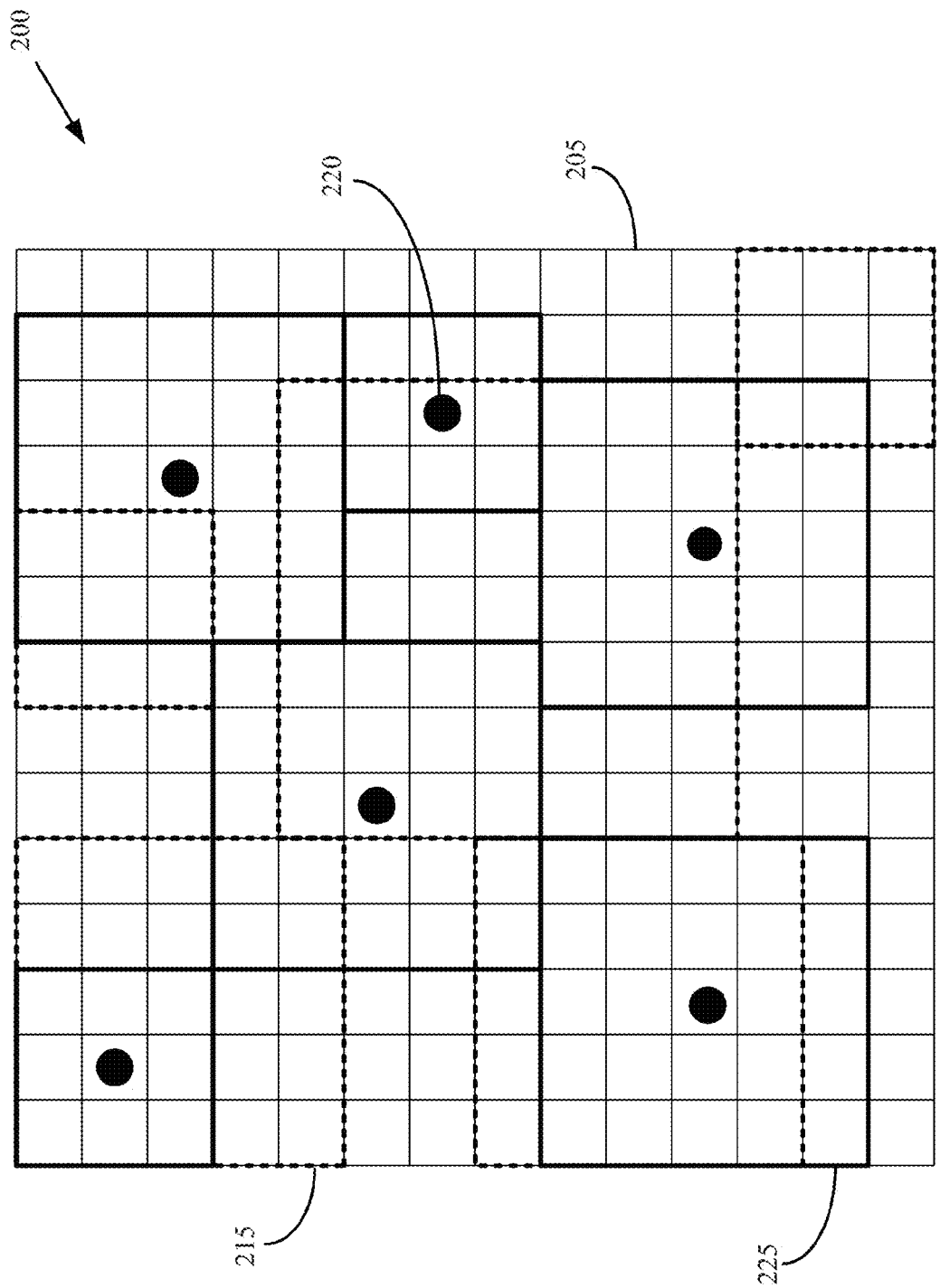
FIG. 2B conceptually illustrates the distribution of master sectors and associated slave sectors in the wireless communication system shown in FIG. 2A during a different iteration of the optimization procedure.

FIG. 2B conceptually illustrates the distribution of master sectors and associated slave sectors in the wireless communication system 200 during a different iteration of the optimization procedure. In the illustrated embodiment, the master/slave sectors 215 in a previous iteration (as illustrated FIG. 2A) are indicated by dashed boxes in FIG. 2B to provide a reference. During the iteration depicted in FIG. 2B a new set of master sectors 220 and their associated slave sectors 225 has been selected according to embodiments of the techniques described herein. The groups of sectors 215 from the previous iteration overlap in part with the groups of sectors 225 in the iteration illustrated in FIG. 2B. This overlap may help to speed convergence of the concurrent optimization procedure, e.g., by reducing the number of iterations that are required to reach a convergence criteria. For example, overlap between the groups of sectors 215, 225 may reduce the number of iterations that are performed before the fractional change in the optimized antenna parameters from one iteration to another iteration falls below a threshold value.

In the illustrated embodiment, substantially all of the sectors 205 may be optimized. Neighboring sectors mutually interfere with each other significantly up to a certain distance or separation between the sectors 205. Each of the sectors 205 may therefore be modeled as an independent entity that implements that operates an optimization algorithm and also includes antenna resources that are optimized by the sector 205 if it is a master sector or by a neighboring sector if the sector 205 is a slave sector. In one embodiment, the master and slave sectors may be selected for concurrent optimization using an algorithm that allows each sector 205 to begin to reserve antenna resources of some sectors 205 and its neighbor list and then if it is successful, the sector 205 may continue to attempt to gain exclusive access to the antenna resources of the other sectors in its neighbor list until it either is granted control of all the necessary slave sectors or it fails and relinquishes control of its resources or the resources of its neighbor sectors to another master sector. However, it is well known that this approach often leads to deadlocks that occur when most of the sectors 205 have been granted control of the antenna resources of some portion of the sectors in its neighbor list, but are unable to get the missing ones because these are already reserved by another sector 205 that is running the same strategy. None of the sectors 205 can proceed from the deadlock and so they may wait infinitely.

The present application therefore describes an alternative technique for selecting the master and slave sectors. In one embodiment, the master and slave sectors may be selected by implementing deadlock avoidance strategies for resource allocation, which may be referred to as solutions to the philosopher's problem.

Figure 3:
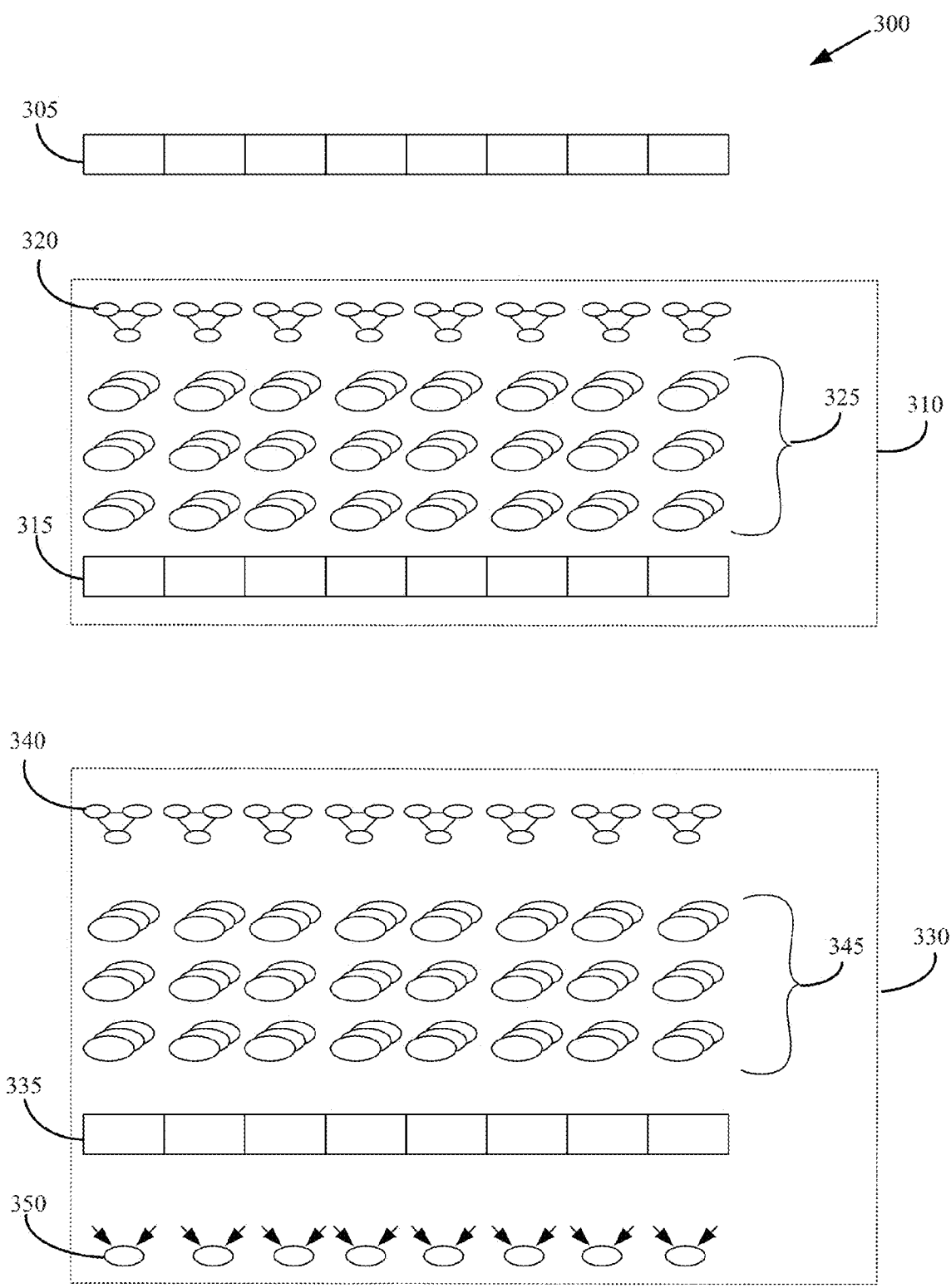
FIG. 3 conceptually illustrates one exemplary embodiment of a mapping of features of the antenna resource allocation technique to the philosopher's problem.

FIG. 3 conceptually illustrates one exemplary embodiment of a mapping 300 of features of the antenna resource allocation technique to the philosopher's problem. In the illustrated embodiment, each potential master sector (e.g., each philosopher) is configured to implement an antenna optimization algorithm 305 that may be executed if the potential master sector is able to acquire control of the slave sectors in its neighbor list. Embodiments of the optimization algorithm 305 are discussed herein. In the illustrated embodiment, the terms "master sector" and "antenna optimization algorithm" may be used interchangeably since each master sector may implement an antenna optimization algorithm.

For the philosopher's drinking problem 310, each potential master sector is able to grant control of its antenna resources 315 or request control of the antenna resources 315 of other sectors. In the illustrated embodiment, the state of each potential master sector 305 is represented by a state diagram 320. For example, each potential master sector 305 may be attempting to acquire control of slave sectors (a trying state), may have granted control of its antenna resources to another master sector (a hold state), may have already acquired control of the slave sectors and may be performing the optimization procedure (an active state), may have finished the optimization procedure and be releasing antenna resources (an exit state), or may be idle (an idle state). The potential master sectors 305 may also be associated with other variables 325 such as a "hold" variable that may be set in response to the potential master sector 305 transmitting a message that grants control of its resources to another potential master sector 305, a "request" variable that indicates that the potential master sector 305 has transmitted a message requesting control of the resources of another potential master sector 305, or other variables.

Each potential master sector 305 may determine whether to grant or deny a request for the antenna resources 315 based in part on its current state. For example, sectors that are in a trying state may deny requests for their resources from sectors that have lower precedence but may grant requests for the resources from sectors that have higher precedence. Sectors that are in a hold state because they have already granted control of their antenna resources to another potential master sector may deny all requests for their antenna resources from other sectors. Sectors that are in an idle state or a free state may grant requests for control of their antenna resources to other sectors regardless of their relative precedence. Persons of ordinary skill in the art having benefit of the present disclosure should appreciate this embodiment is intended to be illustrative and in alternative embodiments other rules or policies for granting or denying resource requests may be used.

For the philosopher's dining problem 330, each potential master sector is able to grant control of its antenna resources 335 or request control of the antenna resources 335 of another sector. In the illustrated embodiment, the state of each potential master sector 305 is represented by a state diagram 340. For example, each potential master sector 305 may be attempting to acquire control of slave sectors (a trying state), may have granted control of its antenna resources to another master sector (a hold state), may have already acquired control of the slave sectors and may be performing the optimization procedure (an active state), may have finished the optimization procedure and be releasing antenna resources (an exit state), or may be idle (an idle state). The potential master sectors 305 may also be associated with other variables 345 such as a "hold" variable or a "request" variable. In the philosopher's dining problem 330, each master sector 305 may also be associated with a node in a precedence graph 350 that indicates the relative precedence of each master sector 305 with respect to other neighboring sectors. As discussed herein, each potential master sector 305 may also determine whether to grant or deny a request for the antenna resources 335 based in part on its current state.

Negotiating the allocation of master sectors and slave sectors on the basis of grants or requests that may be granted or denied on the basis of the relative precedence of the sectors and the current state of the sectors has a number of advantages over conventional practice. For example, this approach is well-suited for implementing parallel (concurrent) allocation of the master and slave sectors. Furthermore, there are mathematical proofs of the existence of solutions to idealized versions of the philosopher's problem.

In one embodiment, the mapping 300 may be used to support optimization of antenna tilts in a radio access system. For example, one sector may be selected as a master sector and optimization functionality in the master sector may optimize its own tilt and the tilt of some close neighbors (e.g., slave sectors). A further ring of sectors may be formed around the slave sectors. The sectors in the further ring may not change their tilts during the optimization, but these sectors may be sufficiently close to the master sector or the slave sectors to feel the effect of the tilt changes. Further outside are sectors that are regarded as substantially unaffected because they are sufficiently far from the master and slave sectors. The master sector, the slave sectors, and the affected ring of sectors may make performance measurements to give indications about the performance of this region. Granting exclusive control of the resources to the master sector during the allocation process may allow the optimization functionality to establish a clean cause-to-effect function (e.g., performance figures derived from the measurements as a function of the various multiple tilt setting combinations). The activities of the optimization functionality in the master sectors should therefore be sufficiently decorrelated. Allowing multiple optimization centers in multiple master sectors to control the same slave sectors may disturb the performance measurements and may reduce the precision of the optimization algorithm. The radio system is assumed to be in operational mode during the optimization process and so the test changes should be small enough that they have a detectable effect, but not a significant negative effect on the performance and coverage as experienced by the user of the mobile terminals. This approach does not require either a tilt-prediction model or planning data at least in part because it is based on the observed performance measurements and can adapt itself automatically to environmental changes without manual intervention.

Figure 4:
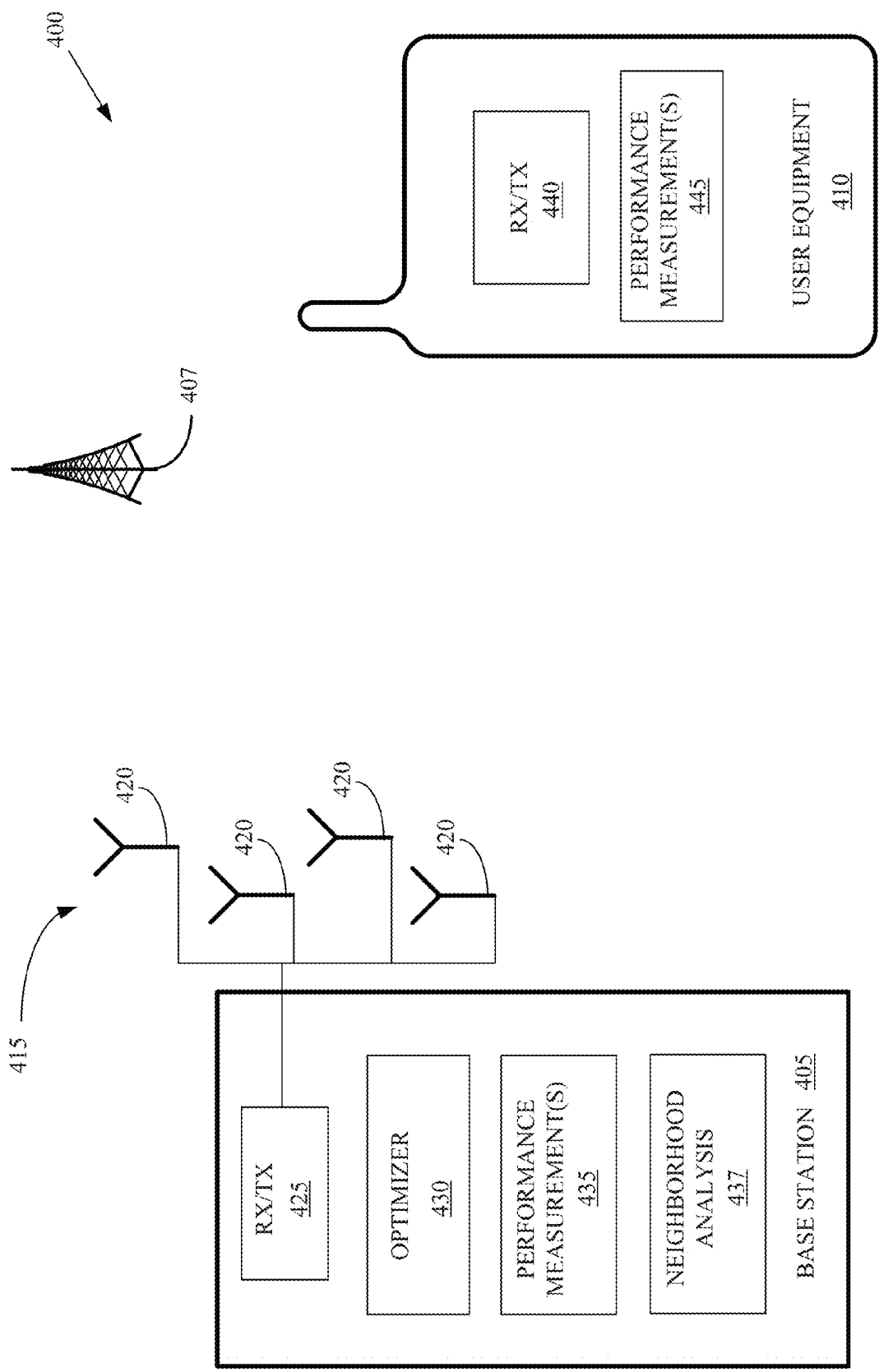
FIG. 4 conceptually illustrates a second exemplary embodiment of a wireless communication system.

FIG. 4 conceptually illustrates a second exemplary embodiment of a wireless communication system 400. In the illustrated embodiment, the wireless communication system whose one or more base stations 405, 407 for providing uplink/downlink wireless connectivity to one or more user equipment 410. The base station 405 is electromagnetically and/or communicatively coupled to an active antenna array 415 that includes multiple antennas 420 for transmitting downlink signals to the user equipment 410 and receiving uplink signals from the user equipment 410. A transceiver (RX/TX) 425 in the base station 405 is used to generate signals and provide the signals to the antenna array 415 to drive the downlink transmissions. The transceiver 425 may also be configured to receive uplink signals from the antenna array 415. In some embodiments, the base station 407 may be configured in a similar manner to the base station 405 or it may use a different configuration. In the interest of clarity the detailed configuration of the base station 407 is not depicted in FIG. 4.

The illustrated embodiment of the base station 400 includes an optimizer 430 that may be configured to optimize antenna resources for one or more sectors that are served by the base station 400 using the antenna array 415 and one or more slave sectors when the base station 400 is providing coverage to a master sector, as discussed herein. The optimizer 430 may also be configured to receive instructions from other base stations and use these instructions to implement optimizations of the antenna resources associated with the antenna array 415 when the base station 405 is operating as a slave sector.

The base station 400 may also be configured to make performance measurements using performance measurement functionality 435. Exemplary performance measurements include, but are not limited to, measuring block error rates for uplink transmissions, channel quality for uplink channels, or other measures of the coverage or capacity supported by the base station 405. The performance measurement functionality 435 may also be configured to receive information indicating the results of performance measurements performed by other entities such as a base station 407 and user equipment 410.

In the illustrated embodiment, the base station 400 can use information acquired from user equipment 410 and communication with other base stations 407 to identify neighboring sectors using neighborhood analysis functionality 437. Neighborhood measurements performed by user equipment 410 and subsequent signaling with near and far neighbors (neighbor-of-neighbor . . . ) of the neighboring sectors identified by the user equipment can be used to build a local view of the distributed graph (e.g., the nodes and plain arcs), as discussed herein. In one embodiment, the local view may include free nodes, which might be queried by other sectors that are attempting to identify their neighbors. Negotiations between neighboring sectors may be performed using functionality in the performance measurement element 437. For example, the performance measurement elements 437 may perform or participate in negotiations that are used to determine who is next to be master or slave, when the change graph arc directions, how to set status bits, or how to decide the roles for each sector.

User equipment 410 includes a transceiver 440 that may be configured to transmit uplink signals towards the base stations 405, 407 or to receive downlink signals from the base stations 405, 407. User equipment 410 may also be configured to make performance measurements using functionality 445. Exemplary performance measurements include, but are not limited to, measuring block error rates for downlink transmissions, channel quality information or pre-coding matrix information for downlink channels, or other measures of the coverage or capacity supported by the base station 405. In the illustrated embodiment, information indicative of the performance measurements may be fed back to the base station 405 so that it can be used as part of the antenna optimization process described herein. In one embodiment, the base station 407 may be configured to make performance measurements and feed information indicating the results of the performance measurements back to the base station 405 so that these results may be used as part of the antenna optimization process.

Figure 5:
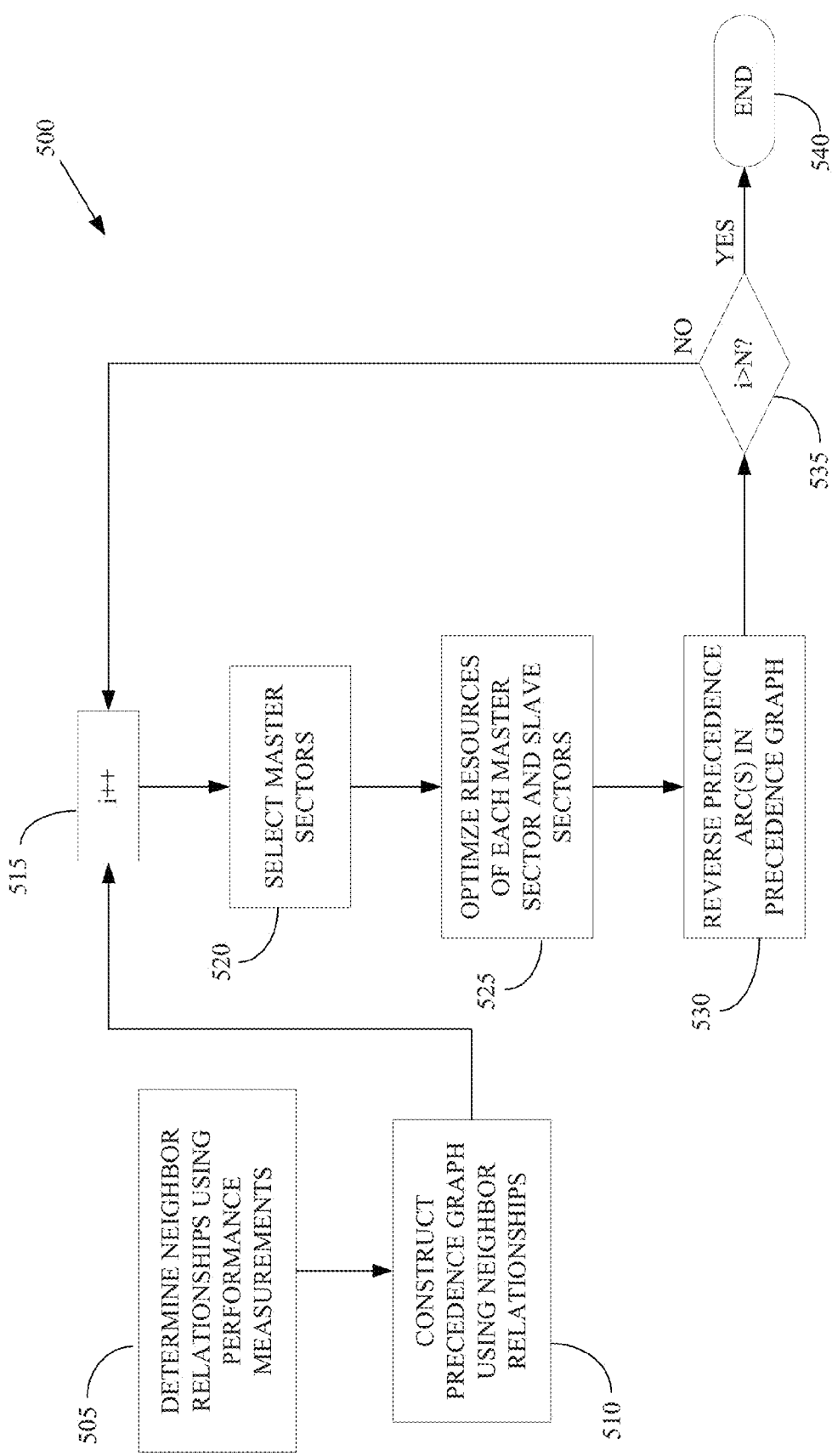
FIG. 5 conceptually illustrates one exemplary embodiment of a method for coordinating concurrent sector optimization at a wireless communication system.

FIG. 5 conceptually illustrates one exemplary embodiment of a method 500 for coordinating concurrent sector optimization at a wireless communication system. In the illustrated embodiment, the wireless communication system includes a plurality of base stations that serve a corresponding number of sectors. Neighbor relationships between the sectors can be determined (at 505) using performance measurements that may be performed by the various base stations, sectors, or user equipment in the wireless communication system. The neighbor relationships may be used to construct (at 510) a precedence graph that indicates the relative precedence of each sector to its neighbor. In one embodiment, the precedence graph can be initialized by giving each sector a unique start identifier, for which a comparison operator like "greater than" is defined to determine the relative precedence. For example, the nodes in the precedence graph associated with each sector can be assigned a random number or another unique identifier such as a number determined by concatenating the boot time of a base station with the serial number of the base station or a sector identifier. The unique identifier may therefore be calculated locally (e.g., by the base station) without checking for duplicates even if the base station's clock is slightly wrong. A new number may be calculated following a system or base station crash to avoid confusion caused by messages that may be circulating around the system and which may still be identified by the pre-crash identifier. The pre-crash identifiers may therefore be removed from the memory of the system. In one embodiment, the precedence graph may be constructed (at 510) and stored in a centralized location or database. However, persons of ordinary skill in the art having benefit of the present disclosure should appreciate that the method 500 is not limited to embodiment that implements a centralized database. Alternative embodiments may implement distributed databases for storing portions of the precedence graph in different locations, e.g., a portion of the precedence graph may be stored in a location or database associated with each sector.

Figure 6B:
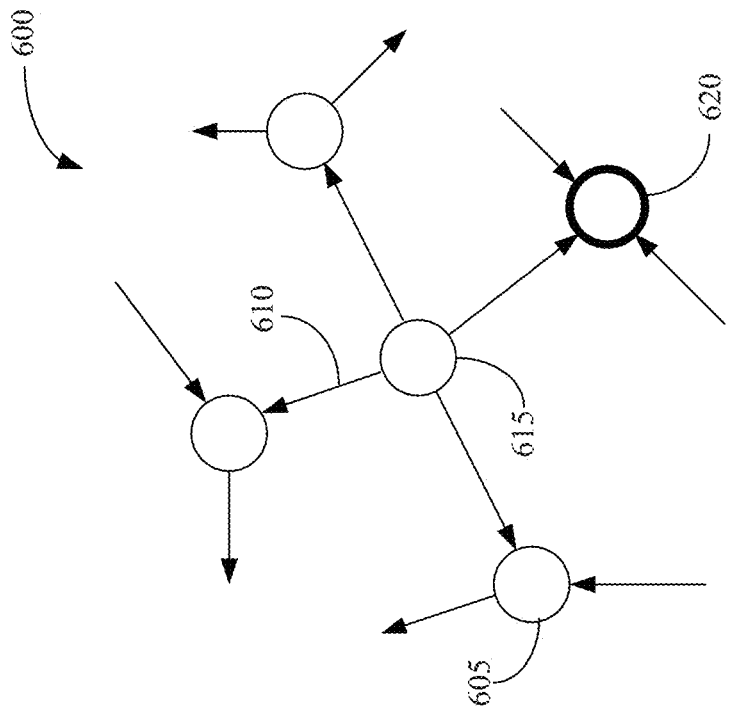
FIG. 6B conceptually illustrates the portion of a precedence graph following iteration of the optimization process performed on the portion depicted in FIG. 6A.
Figure 6A:
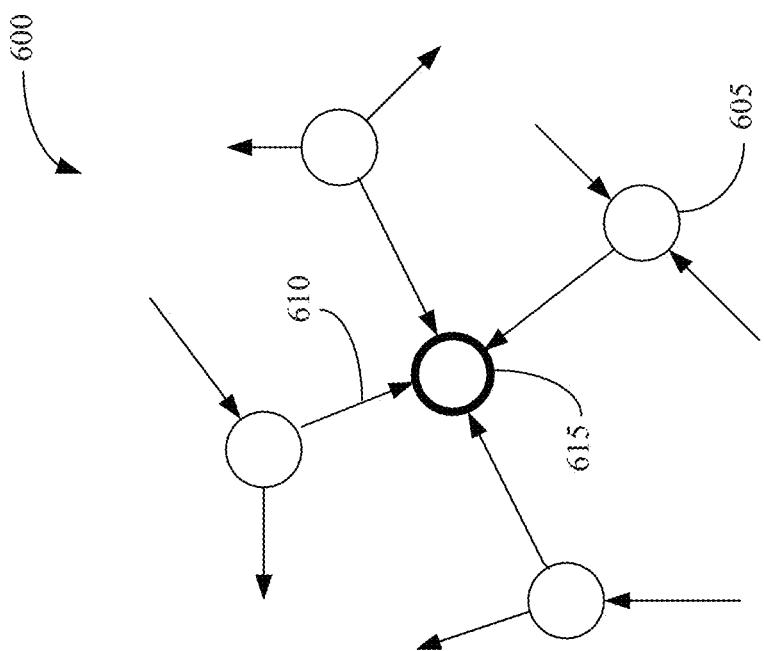
FIG. 6A conceptually illustrates a portion of a precedence graph that may be used in embodiments of the techniques described herein.

FIG. 6A conceptually illustrates a portion 600 of a precedence graph that may be used in embodiments of the techniques described herein. In the illustrated embodiment, the portion 600 of the precedence graph includes a plurality of nodes 605 that are each associated with a sector of the wireless communication system. Precedence between the nodes 605 is indicated by directed arcs 610 between the various nodes 605. Higher precedence is given to the nodes 605 when the corresponding directed arc 610 points to the node 605 and lower precedence is giving to the nodes 605 when the corresponding directed arc 610 points away from the node 605. In the illustrated embodiment, the node 615 has a higher precedence than all of its neighbor nodes 605 and so the node 615 may be selected as a master sector for an iteration of the optimization process, as indicated by the bold circle. However, alternative indications of the relative precedence of the nodes 605, 615 may be used in alternative embodiments.

Referring back to FIG. 5, the method 500 may use an iteration counter (i) to determine when to terminate iterations of the optimization process. In the illustrated embodiment, the iteration counter is incremented (at 515) before iterations of the optimization process and the process can continue until the iteration counter reaches a predetermined value (N). However, persons of ordinary skill in the art having benefit of the present disclosure should appreciate that alternative stopping criteria may be used in different embodiments of the method 500. In one alternative embodiment, the method 500 may continue to iterate until a convergence criterion is satisfied. For example, the method may continue to iterate until the fractional change per iteration in the values of the antenna parameters subject to the optimization falls below a threshold value such as 1%.

For each iteration, one or more master sectors may be selected (at 520) for concurrent optimization along with the corresponding slave sectors. In one embodiment, the master sector and slave sectors may be selected (at 520) according to embodiments of the techniques described herein, such as the techniques depicted in FIGS. 1-3. In one embodiment, the master sectors may be selected (at 520) concurrently with selection of other master sectors. However, persons of ordinary skill in the art having benefit of the present disclosure should appreciate that the method 500 is not limited to concurrent selection (at 520) of the master sectors. Alternative embodiments of the method may allow each master sector to be selected (at 520) independently or asynchronously with selection (at 520) of other master sectors. For example, one master sector may attempt to acquire control of the neighbor resources by negotiating with the others, which might at this time already be a master sector, a slave sector, or a free sector. In alternative embodiments, the i-loop (from 510 to 535) may therefore run independently or asynchronously for each potential master sector.

The antenna resources for the master sector(s) and corresponding slave sectors may then be concurrently optimized (at 525). In one embodiment, a gradient ascent method may be used to perform the optimization for each master sector and its associated slave sectors. For example, a variation of the gradient ascent method may be used to optimize the vertical antenna tilt of an orthogonal frequency division multiple access (OFDMA) base station with respect to a given utility metric. In the illustrated embodiment, each base station provides coverage to a cell that is divided up into three sectors and the overall system topology consists of a set P of sectors with a total of |P| antennas for |P| sectors. An exemplary utility metric may be defined as:

$$U = \frac{1}{|P|} \sum_{m \in P} (W_{avg} s_{m,avg} + W_{edge} s_{m,edge})$$

In this utility metric, the average spectral efficiency over the entire sector m is given by $s_{m,avg}$ and the 5% quantile of the distribution of the spectral efficiency over the entire sector m is given by $s_{m,edge}$. One set of exemplary weights is given by:

$$W_{avg} = \frac{1}{\text{bits/s/Hz}} \text{ and } W_{edge} = \frac{10}{\text{bits/s/Hz}}$$

However, persons of ordinary skill in the art having benefit of the present disclosure should appreciate that the values of the weights are matters of design choice.

In the illustrated embodiment, each antenna m∈P can adopt an individual tilt so that the tilt of all the antennas can be described as a tilt vector:

$$\overline{\varphi} = \begin{pmatrix} \vdots \\ \varphi_m \\ \vdots \end{pmatrix}$$

The tilt vector has |P| dimensions. In the illustrated embodiment, the angles of the tilt can be initialized to a predetermined value such as 11°. The master sector ($j_t$) is chosen as a starting point and the slave sectors are combined with the master sector to form a cluster:

$$C_j = \{j_t\} \cup \{m | m = \text{neighbor}(j_t)\}$$

As discussed herein, the slave sectors for each master sector may be identified using neighbor relations that may be determined using performance measurements such as measurements of mutual interference between sectors. Within the set of sectors $C_j$, the gradient of the utility function U with respect to the individual tilt $\phi_i$ can be determined using the individual differentials:

$$\frac{\partial U}{\partial \varphi_i} = \begin{cases} \frac{U(\varphi_i + \Delta_i) - U(\varphi_i - \Delta_i)}{(\varphi_i + \Delta) - (\varphi_i - \Delta)} & \text{for } t \in C_j \backslash S \\ 0 & \text{else} \end{cases}$$

where $$\Delta_i = \begin{pmatrix} \vdots \\ \Delta_\square \delta_{im} \\ \vdots \end{pmatrix}$$

for m∈P and $\delta_{im}$ is the Kronecker delta function. The set S is defined as:

$$S = \{i | U_{(\phi_i)} < U_{(\phi_i + \Delta_i)} \text{ and } U_{(\phi_i)} < U_{(\phi_i - \Delta_i)}\}$$

The set S is the set of sectors for which a change of the tilt angle by $\Delta_i$ in either direction indicates a minimum. The maximal absolute value of the tilt differentials is given by:

$$c = \max_{i \in C_j} \frac{\partial U}{\partial \varphi_i}$$

This maximal absolute value can be used as a normalization factor when determining the candidate vertical angles, e.g., using the following expression:

$$\varphi_{m,k} = \begin{cases} \left\lfloor \varphi_m + \frac{k}{c} \frac{\partial U}{\partial \varphi_m} + 0.5 \right\rfloor & \text{for } m \in C_j \text{ and } k \in K \\ \varphi_m & \text{for } m \in P \backslash C_j \text{ and } k \in K \end{cases}$$

In the above expression, K={1, 2, . . . $k_{max}$}. The original set K is further modified to a set K* containing additional real number elements that are intermediate between the ones yielding the best and the second best utilities. In that case, a number |K*| of new tilt vectors, which are indexed by k, can be obtained:

$$\varphi_k = \begin{pmatrix} \vdots \\ \varphi_{m,k} \\ \vdots \end{pmatrix} \text{ for all } m \in P \text{ and } k \in K^*$$

In this embodiment, the normalization factor c helps to limit the largest change of an individual angle to ±$k_{max}$.

The best-performing tilt vector may then be selected out of the tested angles:

$$\phi : \phi_i, \phi_i + \Delta_i, \phi_i - \Delta_i, \phi_k$$

The selected best-performing tilt vector can be adopted as the new tilt vector for the corresponding sector:

$$\overline{\varphi_{i+1}} = \arg\max_\varphi (U_{(\varphi_i)}, \{U_{(\varphi_i + \Delta_i)} | i \in C_j\}, \{U_{(\varphi_i - \Delta_i)} | i \in C_j\}, \{U_{(\varphi_i)} | k \in K^*\})$$

However, persons of ordinary skill in the art having benefit of the present disclosure should appreciate that alternative embodiments of the method 500 may use other techniques for concurrently optimizing (at 525) the resources of the master and slave sectors. Moreover, optimization (at 525) of the antenna resources may include optimization of other antenna parameters such as an azimuth, a transmission power, a beamforming parameter, or a beamwidth.

As each master sector completes the optimization (at 525), the precedence arcs connected to the master and slave sectors involved in the optimization may be reversed (at 530) so that the master sector relinquishes precedence to the neighbors at the other ends of the arcs. Reversing (at 530) precedence upon completion of the optimization procedure contributes to fairness of the method 500. The value of the iteration counter (i) may then be checked (at 535) to determine whether the stopping criterion (i>N) has been satisfied. If not, the iteration counter is incremented (at 515) and another iteration of the optimization process may be performed. If the stopping criterion is satisfied, the method 500 may end (at 540). Persons of ordinary skill in the art having benefit of the present disclosure should appreciate that the stopping criterion shown in FIG. 5 is intended to be illustrative. Alternative embodiments of the method 500 may implement other stopping criteria. For example, the method 500 may iterate until a performance limit is reached or until the gain per iteration becomes too small to be worth continuing. Furthermore, in some embodiments the method 500 may not include a stopping criterion the method 500 may continue to iterate without limit.

FIG. 6B conceptually illustrates the portion 600 of a precedence graph following iteration of the optimization process performed on the portion 600 depicted in FIG. 6A. As discussed herein, precedence between the nodes 605 is indicated by directed arcs 610 between the various nodes 605. Higher precedence is given to the nodes 605 when the corresponding directed arc 610 points to the node 605 and lower precedence is given to the nodes 605 when the corresponding directed are 610 points away from the node 605. However, the precedence indicated by the directed arcs 600 connected to the node 615 in FIG. 6B has been reversed relative to the orientation of the corresponding directed arcs 610 shown in FIG. 6A. In the illustrated embodiment, the node 615 now has a lower precedence relative to its neighbor nodes 605. A different node 620 now has higher precedence relative to its neighbor nodes 605 and may be selected as a master sector for an iteration of the optimization process, as indicated by the bold circle.

Figure 7:
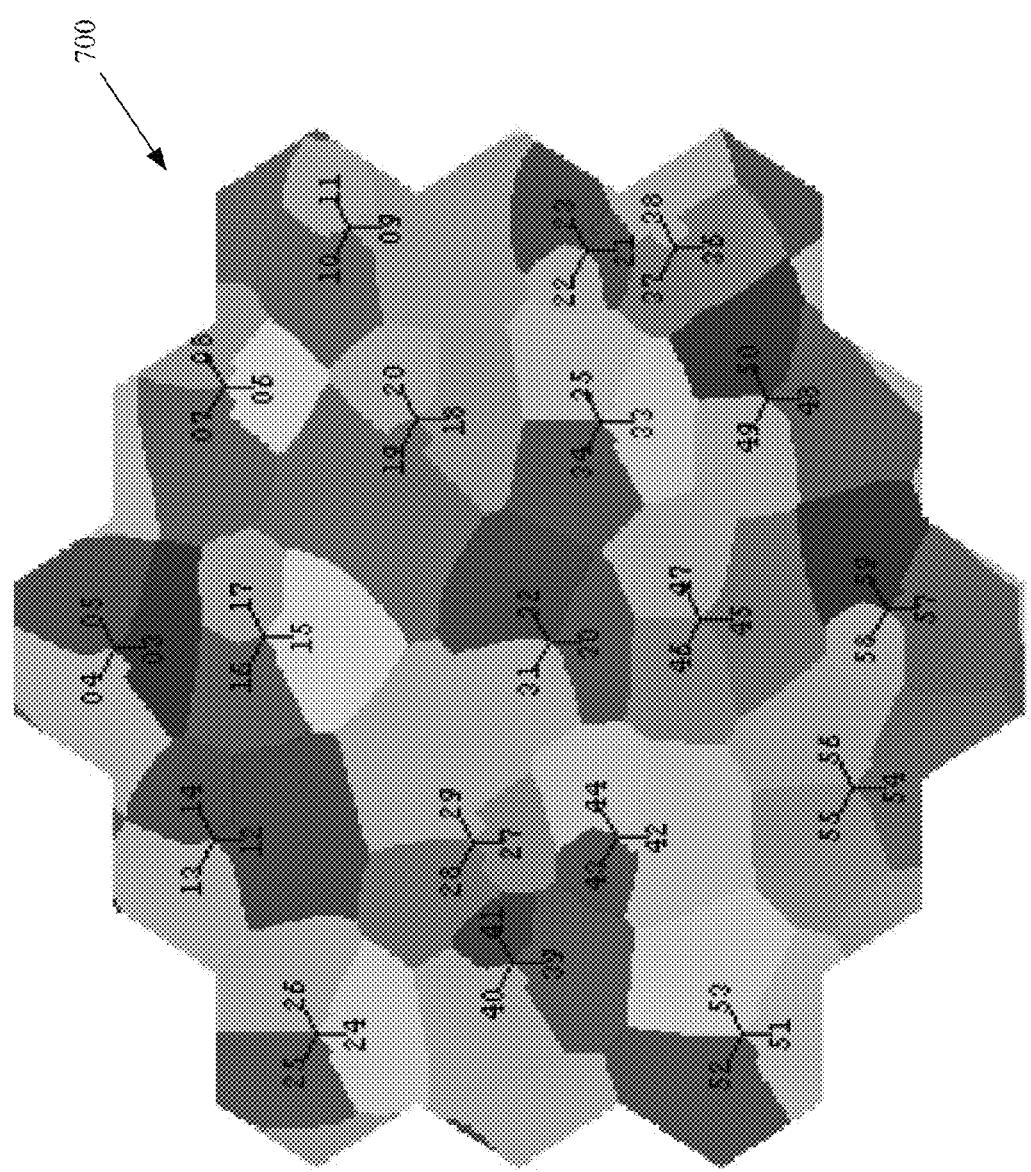
FIG. 7 conceptually illustrates one exemplary embodiment of the result of the simulation that implements embodiments of the sector selection and optimization process described herein.

FIG. 7 conceptually illustrates one exemplary embodiment of the result 700 of the simulation that implements embodiments of the sector selection and optimization process described herein. In the illustrated embodiment, sectors were simulated using an LTE downlink radio model. The 19 site locations are randomly displaced from regular positions and slow fading was assumed for the downlink transmissions. A 3-D antenna model was used. The optimization metric included capacity and coverage and was optimized over the whole area depicted in FIG. 7. For historic reasons, the 57 sectors shown in FIG. 7 are numbered from 3 to 59. The simulation covers the area served by one optimization center (master sector) and its neighbors (slave sectors) and periodic boundary conditions are adopted so that the simulation area wraps around at the boundaries. In the illustrated embodiment, the optimization center coordinates its own antenna tilt and the tilt changes of its 6 closest neighbors. The remaining 50 sectors keep their antenna tilt unchanged, but they may be affected by interference from the seven sectors that are participating in the optimization and each of the sectors makes performance measurements. No unaffected sectors are shown. FIG. 7 depicts the coverage areas of the sectors after the optimization has completed. In the illustrated embodiment, the optimization procedure was iterated so that each of the 57 sectors acted as the optimization center for several iterations until a stable overall performance equilibrium was achieved.

Figure 8:
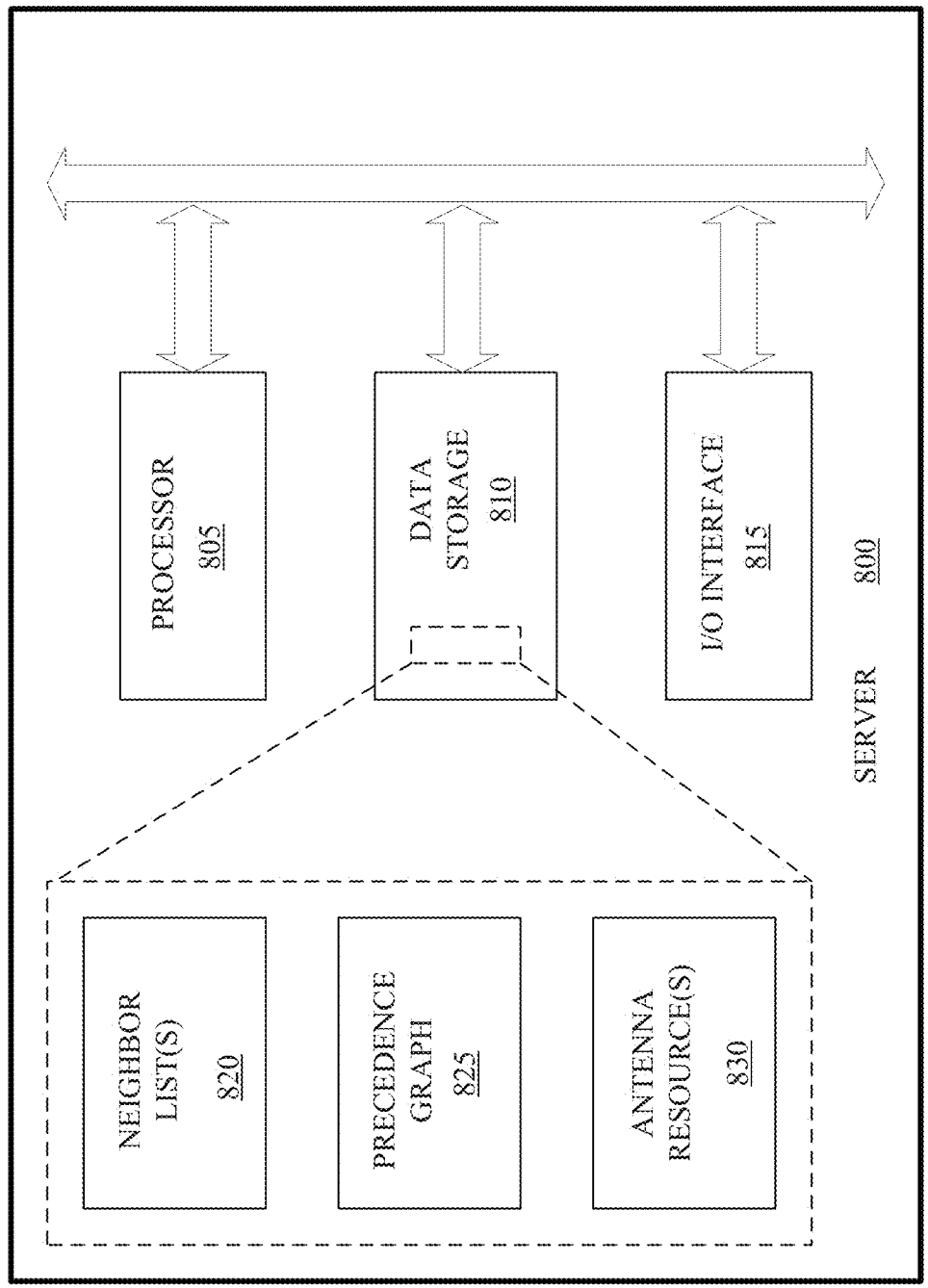
FIG. 8 conceptually illustrates one exemplary embodiment of a server.

FIG. 8 conceptually illustrates one exemplary embodiment of a server 800 that may be used to determine or store neighbor lists for sectors of a wireless communication system, define or store precedence graphs based on the neighbor list, or perform concurrent sector optimizations. In the illustrated embodiment, the server 800 includes a processor 805, data storage 810, and an input/output (I/O) interface 815. The processor 805 is configured to control operation of the server 800. e.g., using data or instructions stored in the data storage 810 or at other locations. Embodiments of the operations that may be performed by the server 800 are described herein in conjunction with FIGS. 1-7. In one embodiment, the data storage 810 stores information 820 that represents one or more sector neighbor lists, information 825 that represents portions of the precedence graph, or information 830 that represents antenna resources during intermediate stages of concurrent optimization or following completion of concurrent optimization.

Although FIG. 8 depicts a single server 800, persons of ordinary skill in the art having benefit of the present disclosure should appreciate that alternative embodiments may use multiple servers and may distribute portions of the functionality depicted FIG. 8 throughout the multiple servers. In some embodiments, the server 800 may be a virtual machine. In some of these embodiments, the virtual machine may include components from different machines or be geographically dispersed. For example, the data storage 810 and the processor 805 may be in two different physical machines. In one embodiment, the server 800 may be implemented as a distributed server that is incorporated in multiple base stations (serving numerous sectors) without the need for a central server. When processor-executable programs such as the social network services 830 are implemented on the processor 805, the program code segments combine with the processor 805 to provide a unique device that operates analogously to specific logic circuits.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    determining, in at least one server, neighbor relationships between a plurality of sectors;
    constructing, in the at least one server, a precedence graph using the neighbor relationships to link neighboring sectors by a plurality of directed arcs to indicate relative precedence of the neighboring sectors; and
    iteratively allocating, in the at least one server, at least one antenna resource of each of the plurality of sectors by:
    selecting a subset of the plurality of sectors as master sectors, wherein each master sector is associated with at least one slave sector that neighbors the master sector, and wherein each master sector has precedence over its associated slave sectors, and wherein each slave sector is only associated with one master sector;
    concurrently optimizing allocation of said at least one antenna resource for each master sector and its associated slave sectors;
    reversing precedence indicated by the directed arcs linked to each master sector following optimization of the allocation of said at least one antenna resource; and
    iterating so that each of the plurality of sectors is selected as a master sector for at least one iteration.

2. The method of claim 1, wherein said at least one antenna resource comprises at least one of an antenna tilt, an azimuth, a transmission power, a beamforming parameter, or a beamwidth.

3. The method of claim 1, wherein determining the neighbor relationships comprises determining the neighbor relationships based on inter-sector interference levels that are determined based on performance measurements that indicate radiation patterns of each of the plurality of sectors.

4. The method of claim 3, wherein determining the neighbor relationships comprises determining the neighbor relationships based on performance measurements made by at least one of the plurality of sectors or at least one user equipment served by at least one of the plurality of sectors.

5. The method of claim 1, wherein determining the neighbor relationships comprises receiving reports from user equipment identifying other sectors detected by the user equipment and then communicating with said other sectors to identify at least one additional neighboring sector.

6. The method of claim 1, wherein selecting the master sectors comprises exchanging a request to become a master sector between neighboring sectors and determining whether to grant the request based on a directed arc between the neighboring sectors and a state of the sector that receives the request.

7. The method of claim 6, wherein the state of the sector comprises at least one of optimizing, attempting to optimize, holding for optimization, or idle.

8. A method comprising:
    selecting, in at least one server, a subset of a plurality of sectors as master sectors, wherein each master sector is associated with at least one slave sector that neighbors the master sector, and wherein each master sector has precedence over its associated slave sectors, and wherein each slave sector is only associated with one master sector;
    optimizing, in the at least one server, allocation of at least one antenna resource of each master sector concurrently with antenna resources of its associated slave sectors;
    selecting, in the at least one server, a new subset of master sectors by reversing precedence between master sectors and their associated slave sectors following optimization of the allocation of said at least one antenna resource; and
    iterating so that each of the plurality of sectors is selected by the at least one server as a master sector for at least one iteration.

9. The method of claim 8, wherein said at least one antenna resource comprises at least one of an antenna tilt, an azimuth, a transmission power, a beamforming parameter, or a beamwidth.

10. The method of claim 8, further comprising:
    determining neighbor relationships between the plurality of sectors; and
    constructing a precedence graph using the neighbor relationships to link neighboring sectors by a plurality of directed arcs to indicate relative precedence of the neighboring sectors.

11. The method of claim 10, wherein determining the neighbor relationships comprises determining the neighbor relationships based on inter-sector interference levels that are determined based on performance measurements that indicate radiation patterns of each of the plurality of sectors.

12. The method of claim 11, wherein determining the neighbor relationships comprises determining the neighbor relationships based on performance measurements made by at least one of the plurality of sectors or at least one user equipment served by at least one of the plurality of sectors.

13. The method of claim 10, wherein determining the neighbor relationships comprises receiving reports from user equipment identifying other sectors detected by the user equipment and then communicating with said other sectors to identify at least one additional neighboring sector.

14. The method of claim 8, wherein selecting the master sectors comprises exchanging a request to become a master sector between neighboring sectors and determining whether to grant the request based on a directed arc between the neighboring sectors and a state of the sector that receives the request.

15. The method of claim 14, wherein the state of the sector comprises at least one of optimizing, attempting to optimize, holding for optimization, or idle.

* * * * *